United States Patent Office 3,117,059
Patented Jan. 7, 1964

3,117,059
o-BENZYLPHENOXY-β-N-PIPERIDINOPROPANES
AS ANTITUSSIVE COMPOSITIONS
Kurt Rubinstein, Horsholm, Denmark, assignor to
Aktieselskabet Pharmacia, Copenhagen, Denmark
No Drawing. Filed Apr. 27, 1961, Ser. No. 105,916
Claims priority, application Denmark Apr. 28, 1960
5 Claims. (Cl. 167—55)

This invention relates to new chemical compounds and to their preparation and to compositions containing said compounds.

The new chemical compounds with which the present invention is concerned are o-benzylphenoxy-β-N-piperidinopropane represented by the structural formula

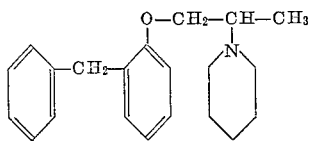

and the pharmaceutically acceptable acid addition salts thereof.

The compounds of this invention have strong antitussive or cough-relieving properties and are largely free of undesirable side effects.

The compounds of the invention may be prepared by reacting o-benzylphenoxy-β-chloropropane with piperidine to give o-benzylphenoxy-β-N-piperidinopropane and recovering said compound from the reaction mixture obtained either as the free base which may then be converted into the desired acid addition salt or as the desired acid addition salt or as another acid addition salt which is then converted into the free base or into the desired acid addition salt.

The acid addition salts may be a salt of the base with, for example, hydrochloric, sulfuric, phosphoric, acetic, citric, tannic, 2,6-ditertiarybutyl-naphthalene-1,7-disulfonic or 4,4-methylene-bis-(3-hydroxy-2-naphthoic acid). The preferred acid addition salts are the salt of the base with phosphoric acid which salt is non-hydroscopic and stable and especially suitable for the preparation of an antitussive composition in the form of tablets and the salt of the base with 2,6-ditertiarybutyl-naphthalene-1,7-disulfonic acid which salt is only very slightly soluble in water and especially suitable for the preparation of the liquid antitussive composition in the form of a suspension.

The compounds of the invention may be prepared in the following manner.

EXAMPLE 1

A mixture of 26.1 g. of o-benzylphenoxy-β-chloropropane and 17 g. of piperidine is refluxed over a period of 32 hours until the temperature is about 124° C. and a nearly solid mixture is formed due to the precipitation of a salt. The mixture is then refluxed over a period of 48 hours at about 160° C. and the reaction product obtained is cooled and dissolved in methanol. The solution is concentrated under reduced pressure to yield an oil which is added to 200 ml. 3 N hydrochloric acid whereupon the mixture is shaken with ether, 3 x 100 ml., until the aqueous phase is clear. The ether solution is washed with water, 3 x 50 ml., and the water present in the combined aqueous phase and water used for washing is evaporated under reduced pressure methanol being added three times when the residue appears to be dry. The impure hydrochloride of o-benzylphenoxy-β-N-piperidinopropane, 41 g., obtained is dissolved in 100 ml. water and 100 ml. 30% aqueous sodium hydroxide solution are added, whereupon precipitated oil is extracted with ether, 1 x 100 and 2 x 50 ml. The ether solution is washed with water, 4 x 50 ml., dried with magnesium sulfate and the ether is removed under reduced pressure. The residue, 25.2 g., is distilled under reduced pressure and the main fraction, 23.2 g., B.P 159–161° C./0.2 mm. Hg, is dissolved in 75 ml. 1-molar phosphoric acid. The solution is evaporated under reduced pressure methanol being added three times when the residue appears to be dry. The residue, 31 g., is recrystallized twice with 85 and 80 ml. absolute ethanol and dried over a period of 4 hours under reduced pressure in the presence of sulfuric acid. 27 g. of pure o-benzylphenoxy-β-N-piperidinopropane trihydrogenphosphate, M.P. 150–152° C., are obtained.

A solution of 4.45 g. of the disodium salt of 2,6-ditertiarybutyl-naphthalene-1,7-disulfonic acid in 25 ml. of hot water is added to a solution of 8.15 g. of the trihydrogenphosphate of o-benzylphenoxy-β-N-piperidinopropane in 25 ml. hot water and the precipitated oil is crystallized at −5° C. The crystalline product is recovered, washed several times with water and dried under reduced pressure in the presence of sulfuric acid. The crude product, 7.5 g., M.P. 235–242° C., is dissolved in 40 ml. boiling methanol and filtered and the filtrate is crystallized at −20° C. The crystals are recovered and dried, 6.5 g., M.P. 245–248° C., recrystallized twice with 40 and 30 ml. methanol and dried over a period of 4 hours under reduced pressure at 60° C. in the presence of sulfuric acid. 5.7 g. of pure 2,6-ditertiarybutyl-naphthalene-1,7-disulfonate of o-benzylphenoxy-β-N-piperidinopropane, M.P. 245–248° C., are obtained.

The o-benzylphenoxy-β-chloropropane used as starting material may be prepared in the following manner.

To 121.2 g. of o-benzylphenoxy-β-hydroxypropane liquified by heating 89.2 g. of thionyl chloride are added dropwise in a nitrogen atmosphere over a period of about 4½ hours. The addition takes place while stirring during the first 45 minutes when a solid crystal mass is formed which is melted by heating whereupon the stirring is stopped. The reaction mixture is cooled to room temperature, after 21 hours liquified by heating and after addition of 0.6 ml. of pyridine kept for 3 hours and 15 minutes at 100° C. in a nitrogen atmosphere. The reaction mixture is then added to one liter of ice-cold water and the mixture containing a precipitated oil is left standing for some time and thereafter evaporated under reduced pressure. The solid brown residue is dissolved in 350 ml. of boiling propanol-2 and filtered and the filtrate is crystallized by cooling. The crystalline product is recovered and dried, 105.2 g., M.P. 75.8–78.8° C., and distilled under reduced pressure. The main fraction, B.P. 140–141.2° C./0.2–0.24 mm. Hg, which after cooling is a yellow crystalline substance, 92.5 g., is dissolved in 200 ml. of boiling absolute ethanol and the solution is crystallized at −20° C. The crystalline product is recovered and air-dried. 85 g. of o-benzylphenoxy-β-chloropropane, M.P. 80.4–81.8° C., are obtained. Three further recrystallizations of a sample of the compound with absolute ethanol raise the M.P. to 81.2–82.6° C.

In their application as an antitussive medicine the compounds of the invention may be used directly in the form of the free base or as an acid addition salt. The active agent is, however, preferably employed in the form of a composition together with a usual solid or liquid pharmaceutical carrier, f. ex. in the form of tablets or capsules or as a suspension with any of the conventional additions. Thus in the preparation of tablets or capsules for oral administration the active compound is predominantly combined with solids and/or tabletting adjuvants, such as starch, magnesium stearate, talcum and calcium pyrophosphate. In a similar manner suspensions for oral administration may be prepared by combining the active compound with any of the usual liquid carriers and adjuvants, such as water, sorbitol, magnesium aluminium silicate and colloidal silica and flavouring agents if desired.

The following examples are typical of many various types of antitussive compositions which may be prepared with the compounds of the invention.

EXAMPLE 2

A tablet is prepared in the conventional manner from 30 mg. of trihydrogenphosphate of o-benzylphenoxy-$\beta$-N-piperidinopropane, 20 mg. of starch, 20 mg. of magnesium stearate, 20 mg. of talcum and 160 mg. of calcium pyrophosphate.

EXAMPLE 3

A liquid cough medicine is prepared by suspending by stirring 8 g. of pulverized 2,6-ditertiarybutyl-naphthalene-1,7-disulfonate of o-benzylphenoxy-$\beta$-N-piperidinopropane in a liquid mixture consisting of 700 g. of sorbitol, 310 g. of distilled water, 10 g. of magnesium aluminium silicate, 7 g. of silica gel and 0.5 g. of a flavouring agent.

For a better understanding of the invention reference is made to the following pharmacological data obtained in actual tests with various compounds of the invention.

I. Toxicity (1) *Acute toxicity*.—The intraperitoneal acute toxicity and the oral acute toxicity of the trihydrogenphosphate of o-benzylphenoxy-$\beta$-N-piperidinopropane were determined in albino mice and LD 50 calculated according to Kärber (Arch. exp. Pathol. Pharmakol. 162 (1931), 480).

LD 50 (intraperitoneal application), 192 mg./kg. (corresponding to 146 mg./kg. of the free base).
LD 50 (oral application), 1365 mg./kg. (corresponding to 1040 mg./kg. of the free base).

For the tannate of o-benzylphenoxy-$\beta$-N-piperidinopropane the following LD 50 values were found, the dose being expressed as the free base:

LD 50 (intraperitoneal application), 240 mg./kg.
LD 50 (oral application), 1200 mg./kg.

(2) *Subacute toxicity*.—Groups of five albino rats were fed a diet containing 24, 75 and 150 mg. of the trihydrogenphosphate of o-benzylphenoxy-$\beta$-N-piperidinopropane per kg./day, respectively, for 83 days. 5 rats on the same diet without drug administration served as controls. The drug did not influence food intake or behaviour. The weight gain apparently decreased at increasing doses, but the difference was not statistically significant. Post mortem examination of larynx, thyroid gland, parathyroid gland, myocardium, lung, liver, spleen, adrenal gland, kidney, and bone marrow did not reveal any macroscopic or microscopic abnormalties which could be ascribed to the drug. Corpuscular blood elements were normal in number and appearance.

II. Antitussive Activity in Dogs

The antitussive effect of the trihydrogenphosphate of o-benzylphenoxy-$\beta$-N-piperidinopropane after intravenous, oral and intraperitoneal application was investigated in chloralose anesthetized dogs. 49 dogs were used. Three techniques were applied for the provocation of cough, one being extrarespiratory (stimulation of the chemoreceptors in the carotid body by lobeline, "lobeline cough") and two being respiratory (electrical stimulation of the mucous membrane at the tracheal bifurcature, "tracheo-bronchial cough" and electrical stimulation of the viscereal pleura, "pleural cough").

(a) Intravenous administration: 0.5 mg./kg. (4 dogs) showed little or no antitussive effect in the three techniques.

1 mg./kg. (12 dogs) caused a complete suppression of the tracheo-bronchial as well as the pleural cough. The effect was fully developed immediately after the injection and lasted for about one hour. At this dose the tested compound was practically without effect on lobeline cough.

2 mg./kg. (5 dogs) gave the same effect as 1 mg./kg., but in addition, a considerable effect was also observed against lobeline cough.

(b) Oral administration: 0.5 mg./kg. (3 dogs) showed no antitussive effect in the three techniques.

1 mg./kg. (10 dogs) totally suppressed tracheobronchial cough and pleural cough. The onset was slower than after intravenous administration. No effect was observed against the lobeline induced cough.

2 mg./kg. (4 dogs) totally suppressed all three forms of cough.

(c) Comparison with codeine: The antitussive effect of the tested compound has been compared with that of codeine. Experiments with dogs given codeine (in the form of the free base) orally have shown that 2 mg./kg. was necessary to suppress tracheo-bronchial and tracheal cough, which means that the tested compound is twice as active as codeine under the experimental conditions used.

III. Clinical Tests

The cough-suppressing effect of the trihydrogen-phosphate of o-benzylphenoxy-$\beta$-N-piperidinopropane has been clinically investigated with tablets containing 15 mg., calculated as the free base of the compound. After a preliminary test, a double blind investigation using the tested compound, codeine phosphate (tablets containing 30 mg. calculated as the free base), and placebo was carried out. A special objective test for the evaluation of antitussive effects in humans ("acetylcholine cough test") as described by Haslreiter (Arzneimittel-Forsch. 9 (1959), 769) was also performed. This test was also carried out in double blind arrangement.

A total of 149 hospitalized patients were included in the investigation (146 males and 3 females, age 34–80 years, duration of illness: 7–42 years). 97 patients suffered from chronic bronchitis, or bronchial asthma with bronchitic symptoms. 29 patients had bronchiectasis and four silicosis. 18 patients had cough in connection with tubercular fibrotic lesions of the lungs, pleura or diaphragm, and conditions after lobectomy.

In the preliminary test (24 patients) the dose was fixed (2 tablets three times a day). The drug was well tolerated and in no case did any side effect (such as restlessness, nausea, gastric discomfort) occur which necessitated withdrawal of the medication. Examination of blood status, urine and heart function did not show any changes. Measurements of bronchial resistance were carried out in order to investigate whether the administration of the tested compound caused a bronchial relaxation or a respiratory depression. The latter was the case when codeine was given. In no cases were such changes observed after the tested compound.

The double blind investigation was carried out in 125 patients. The effect was subjectively evaluated and characterized as very good, good, and no effect and the following figures were found:

| Effect | Drug | | |
|---|---|---|---|
|  | Compound tested, percent | Codeine, percent | Placebo, percent |
| Very good | 32⎫70 | 49⎫65 | 10⎫58 |
| Good | 33⎭ | 16⎭ | 48⎭ |
| No effect | 30 | 35 | 42 |

The acetylcholine cough test (102 cases) involving an objective evaluation gave the following results.

| Effect | Drug | | |
|---|---|---|---|
| | Compound tested, percent | Codeine, percent | Placebo, percent |
| Very good | 40 ⎫ 70 | 56 ⎫ 68 | 20 ⎫ 32 |
| Good | 30 ⎭ | 12 ⎭ | 12 ⎭ |
| No effect | 30 | 32 | 68 |

The figures suggest that the tested compound is at least as effective as codeine as an antitussive. The observations show that the tested compound is devoid of the undesirable side effects of codeine.

What is claimed is:

1. As an antitussive composition, the combination of:
    (1) a member selected from the group consisting of o-benzylphenoxy-β-N-piperidino-propane of the formula

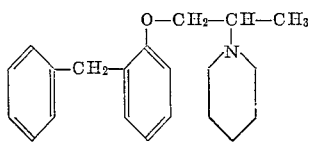

and the acid addition salts thereof with a pharmaceutically acceptable acid,
combined with
    (2) a pharmaceutically acceptable carrier, a dosage unit of said composition containing from about 15 mg. to about 30 mg. of (1) calculated on the o-benzylphenoxy-β-N-piperidino-propane content of the composition.

2. A composition in accordance with claim 1, wherein (1) is the trihydrogen phosphate addition salt of o-benzylphenoxy-β-N-piperidino-propane.

3. A composition in accordance with claim 1, wherein (1) is an acid addition salt of o-benzylphenoxy-β-N-piperidino-propane with 4,4'-methylene-bis-(3-hydroxy-2-naphthoic acid).

4. A composition in accordance with claim 1, wherein the carrier is a solid material.

5. A composition in accordance with claim 1, wherein the carrier is a liquid vehicle.

References Cited in the file of this patent
UNITED STATES PATENTS
2,703,324    Binkley et al. _____ Mar. 1, 1955

OTHER REFERENCES

Ambler: The Journal of Industrial and Engineering Chemistry, volume 12, pages 1084 and 1085 (1920).

Eslager et al.: Journal of the American Chemical Society, volume 79, page 4703 (1957), QD 1.A5.